US011169995B2

(12) United States Patent
Fender et al.

(10) Patent No.: US 11,169,995 B2
(45) Date of Patent: Nov. 9, 2021

(54) RELATIONAL DICTIONARIES

(71) Applicant: Oracle International Corporation, Redwood Shores, CA (US)

(72) Inventors: Pit Fender, Union City, CA (US); Seema Sundara, Nashua, NH (US); Benjamin Schlegel, Merced, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 296 days.

(21) Appl. No.: 15/819,193

(22) Filed: Nov. 21, 2017

(65) Prior Publication Data

US 2019/0155930 A1 May 23, 2019

(51) Int. Cl.
*G06F 7/00* (2006.01)
*G06F 16/2453* (2019.01)
*G06F 16/21* (2019.01)
*G06F 16/22* (2019.01)
*G06F 16/2455* (2019.01)

(52) U.S. Cl.
CPC ...... *G06F 16/24545* (2019.01); *G06F 16/211* (2019.01); *G06F 16/212* (2019.01); *G06F 16/2282* (2019.01); *G06F 16/2456* (2019.01)

(58) Field of Classification Search
CPC .......... G06F 7/74; G06F 8/44; G06F 2212/40; G06F 17/2276; G06F 16/24545; G06F 16/211; G06F 16/2456; G06F 16/2282; G06F 16/212
USPC .................................. 707/719, 752, 693, 713
See application file for complete search history.

(56) References Cited

U.S. PATENT DOCUMENTS

| | | | |
|---|---|---|---|
| 4,497,039 A * | 1/1985 | Kitakami | .................. G06F 7/22 |
| 5,440,735 A | 8/1995 | Goldring | |
| 5,930,785 A * | 7/1999 | Lohman | ............ G06F 16/24544 |
| 6,173,272 B1 * | 1/2001 | Thomas | ................. G06Q 20/00 |
| | | | 705/42 |
| 6,954,758 B1 | 10/2005 | O'Flaherty | |

(Continued)

OTHER PUBLICATIONS

Westmann et al., "The Implementation and Performance of Compressed Databases", SIGMOD Rec., 29(3): pp. 55-67, 2000.

(Continued)

*Primary Examiner* — Mohammed R Uddin
(74) *Attorney, Agent, or Firm* — Hickman Becker Bingham Ledesma LLP

(57) ABSTRACT

Techniques related to relational dictionaries are disclosed. In some embodiments, one or more non-transitory storage media store a sequence of instructions which, when executed by one or more computing devices, cause performance of a method. The method involves storing a code dictionary comprising a set of tuples. The code dictionary is a database table defined by a database dictionary and comprises columns that are each defined by the database dictionary. The set of tuples maps a set of codes to a set of tokens. The set of tokens are stored in a column of unencoded database data. The method further involves generating encoded database data based on joining the unencoded database data with the set of tuples. Furthermore, the method involves generating decoding database data based on joining the encoded database data with the set of tuples.

18 Claims, 12 Drawing Sheets

(56) References Cited

U.S. PATENT DOCUMENTS

| | | | |
|---|---|---|---|
| 7,103,608 B1* | 9/2006 | Ozbutun | G06F 16/24557 707/604 |
| 7,647,291 B2 | 1/2010 | Mosescu | |
| 7,868,789 B1* | 1/2011 | Binnig | G06F 16/24561 341/51 |
| 8,046,377 B2* | 10/2011 | Steinau | G06F 16/2471 707/770 |
| 9,165,008 B1* | 10/2015 | Ramesh | G06F 16/1744 |
| 9,235,590 B1* | 1/2016 | Wang | H03M 7/42 |
| 10,474,652 B2 | 11/2019 | Baskett | |
| 10,901,948 B2 | 1/2021 | Ackerman et al. | |
| 2002/0174111 A1 | 11/2002 | Kougiouris | |
| 2003/0028509 A1* | 2/2003 | Sah | G06F 16/284 |
| 2004/0225673 A1 | 11/2004 | Beck | |
| 2005/0187962 A1* | 8/2005 | Grondin | G06F 16/1744 |
| 2006/0015510 A1 | 1/2006 | Trask | |
| 2007/0050367 A1 | 3/2007 | Suganuma | |
| 2008/0071748 A1* | 3/2008 | Wroblewski | H03M 7/30 |
| 2009/0006399 A1* | 1/2009 | Raman | G06F 16/2456 |
| 2009/0193041 A1* | 7/2009 | Hornibrook | G06F 16/284 |
| 2009/0254513 A1 | 10/2009 | Luukkala et al. | |
| 2010/0030748 A1* | 2/2010 | Netz | G06F 16/24557 707/769 |
| 2010/0030796 A1* | 2/2010 | Netz | H03M 7/30 707/756 |
| 2010/0049730 A1 | 2/2010 | Qiao et al. | |
| 2010/0121863 A1 | 5/2010 | Reed et al. | |
| 2010/0262574 A1 | 10/2010 | Zhou | |
| 2010/0281079 A1* | 11/2010 | Marwah | G06F 16/284 707/812 |
| 2010/0328115 A1* | 12/2010 | Binnig | G06F 16/24561 341/51 |
| 2011/0161387 A1 | 6/2011 | Krueger | |
| 2011/0213766 A1* | 9/2011 | Hong | G06F 16/284 707/718 |
| 2012/0054225 A1* | 3/2012 | Marwah | G06F 16/2453 707/769 |
| 2012/0124106 A1 | 5/2012 | Allen | |
| 2012/0173517 A1* | 7/2012 | Lang | G06F 3/064 707/722 |
| 2012/0323929 A1* | 12/2012 | Kimura | G06F 16/2282 707/748 |
| 2013/0060780 A1 | 3/2013 | Lahiri | |
| 2013/0103655 A1* | 4/2013 | Fanghaenel | G06F 16/2272 707/693 |
| 2013/0103701 A1 | 4/2013 | Vishnubhatta | |
| 2014/0067791 A1* | 3/2014 | Idicula | G06F 16/283 707/714 |
| 2014/0095470 A1 | 4/2014 | Chen et al. | |
| 2014/0122452 A1* | 5/2014 | Faerber | G06F 16/24561 707/693 |
| 2014/0136788 A1* | 5/2014 | Faerber | G06F 17/30315 711/133 |
| 2014/0223029 A1* | 8/2014 | Bhaskar | H03M 7/3088 709/247 |
| 2014/0317087 A1 | 10/2014 | Collins | |
| 2015/0046411 A1* | 2/2015 | Kazmaier | G06F 17/10 707/693 |
| 2015/0074407 A1 | 3/2015 | Palmeri | |
| 2015/0113026 A1* | 4/2015 | Sharique | G06F 16/221 707/812 |
| 2015/0161100 A1* | 6/2015 | Bhatnagar | G06F 17/2735 704/10 |
| 2015/0178305 A1 | 6/2015 | Mueller | |
| 2015/0261882 A1 | 9/2015 | Roberts | |
| 2015/0278268 A1 | 10/2015 | El-Ali | |
| 2016/0092497 A1* | 3/2016 | Oberhofer | G06F 16/2365 707/693 |
| 2016/0098420 A1* | 4/2016 | Dickie | G06F 16/1744 707/693 |
| 2016/0132692 A1* | 5/2016 | Kerschbaum | G06F 21/6227 713/189 |
| 2016/0147776 A1* | 5/2016 | Florendo | G06F 16/221 707/694 |
| 2016/0147804 A1 | 5/2016 | Wein | |
| 2016/0241577 A1 | 8/2016 | Johnson | |
| 2016/0246811 A1* | 8/2016 | Ackerman | G06F 16/1744 |
| 2017/0031976 A1 | 2/2017 | Chavan | |
| 2017/0046386 A1* | 2/2017 | Kirk | G06F 16/24542 |
| 2017/0109406 A1 | 4/2017 | Chavan | |
| 2017/0134044 A1* | 5/2017 | Lyle | H03M 7/3066 |
| 2017/0242876 A1 | 8/2017 | Dubost | |
| 2018/0089261 A1* | 3/2018 | Li | G06F 16/221 |
| 2018/0150494 A1 | 5/2018 | Schulze | |
| 2018/0211143 A1 | 7/2018 | Haruta | |
| 2018/0218020 A1 | 8/2018 | Dutta | |
| 2018/0365290 A1* | 12/2018 | Kaushik | G06F 16/24545 |
| 2019/0102346 A1 | 4/2019 | Wang et al. | |
| 2019/0155930 A1 | 5/2019 | Fender | |
| 2020/0394191 A1 | 12/2020 | Fender | |
| 2020/0394192 A1 | 12/2020 | Fender | |

OTHER PUBLICATIONS

Ristov, Strahil, LZ Trie and Dictionary Compression, Software: Practice and Experience, vol. 35, Issue 5, pp. 445-465, Apr. 25, 2005.

Ray et al., "Database Compression: A Performance Enhancement Tool", Proc. of 7th Intl. Conf. on Management of Data, COMAD, 1995, 20 pages.

Poess et al., "Data Compression in Oracle", VLDB 2003: Proceedings of the 29th International Conference on Very Large Data Bases, pp. 937-947.

Binnig et al., "Dictionary-based order-preserving string compression for main memory column stores", ACM SIGMOD 2009, 13 pages.

Antoshenkov et al., "Order Preserving Compression", ICDE 1996: Proceedings of the Twelfth International Conference on Data Engineering, pp. 655-663.

Abadi et al., "Integrating Compression and Execution in Column-Oriented Database Systems", SIGMOD 2006, pp. 671-682.

Palkar, et al., "Filter Before You Parse: Faster Analytics on Raw Data with Sparser", Proceedings of the VLDB Endowment, vol. 11, No. 11, dated 2018, 14 pages.

Mustard et al., "JumpGate: Towards In-Network Data Processing", dated 2019, 3 pages.

Kornacker et al., "Impala: A Modern, Open-Source SQL Engine for Hadoop", 7th Biennial Conference on Innovative Data Systems Research (CIDR'15) dated Jan. 4-7, 2015, 10 pages.

Balkesen et al., "RAPID: In-Memory Analytical Query Processing Engine with Extreme Performance perWatt", SIGMOD'18, Jun. 10-15, 2018, Houston, TX, USA, 13 pages.

Agrawal et al., "A Many-core Architecture for In-Memory Data Processing", MICRO-50, Oct. 14-18, 2017, Cambridge, MA, USA, 14 pages.

Giannikis, U.S. Appl. No. 15/819,891, filed Nov. 21, 2017, Office Action, dated Mar. 19, 2020.

Kandukuri, U.S. Appl. No. 15/861,212, filed Jan. 3, 2018, Office Action, dated Jan. 3, 2020.

Fender, U.S. Appl. No. 15/897,375, filed Feb. 15, 2018, Office Action, dated Jan. 17, 2020.

Wust et al., "Sparse Dictionaries for In-Memory Column Stores", DBKDA 2012, 9 pages.

Vagata et al., "Scaling the Facebook data warehouse to 300 PB", dated Apr. 10, 2014, 10 pages.

Sanders et al., "Optimize storage with deep compression in DB2 10", dated , May 17, 2012, 41 pages.

Patil et al., "Inverted Indexes for Phrases and Strings", SIGIR dated 2011, 10 pages.

Bentley, et al., "Fast Algorithms for Sorting and Searching Strings", SODA 1997, 10 pages.

Bender et al., "Anti-Persistence on Persistent Storage: History-Independent Sparse Tables and Dictionaries", PODS'16, Jun. 26-Jul. 1, 2016, San Francisco, CA, USA, 14 pages.

(56) References Cited

OTHER PUBLICATIONS

Antoshenkov et al., "Order Preserving Compression", ICDE, dated 1996, 9 pages.
Fender, U.S. Appl. No. 16/155,740, filed Oct. 9, 2018, Office Action, dated Jul. 24, 2020.
Kandukuri, U.S. Appl. No. 15/861,212, filed Jan. 3, 2018, Notice of Allowance, dated May 27, 2020.
Giannikis, U.S. Appl. No. 15/819,891, filed Nov. 241, 2017, Notice of Allowance, dated Jun. 18, 2020.
Lahiri, U.S. Appl. No. 14/709,018, filed May 11, 2015, Final Office Action, dated Jan. 26, 2021.
Fender, U.S. Appl. No. 16/442,015, filed Jun. 14, 2019, Notice of Allowance, dated Jan. 14, 2021.
Fender, U.S. Appl. No. 16/155,740, filed Oct. 9, 2018, Final Office Action, dated Jan. 12, 2021.
Fender, U.S. Appl. No. 15/897,375, filed Feb. 15, 2018, Office Action, dated Jan. 1, 2021.
Fender et al., U.S. Appl. No. 16/441,989, filed Jun. 14, 2019, Non-Final Office Action dated May 26, 2021.
Fender et al., U.S. Appl. No. 16/155,740, filed Oct. 9, 2018, Advisory Action dated Mar. 22, 2021.
Fender et al., U.S. Appl. No. 16/155,740, filed Oct. 9, 2018, Notice of Allowance dated Aug. 24, 2021.
Fender et al., U.S. Appl. No. 15/897,375, filed Feb. 15, 2018, Notice of Allowance dated May 14, 2021.
Fender et al. U.S. Appl. No. 15/897,375, filed Feb. 15, 2018, Supplemental Notice of Allowability dated Aug. 19, 2021.

\* cited by examiner

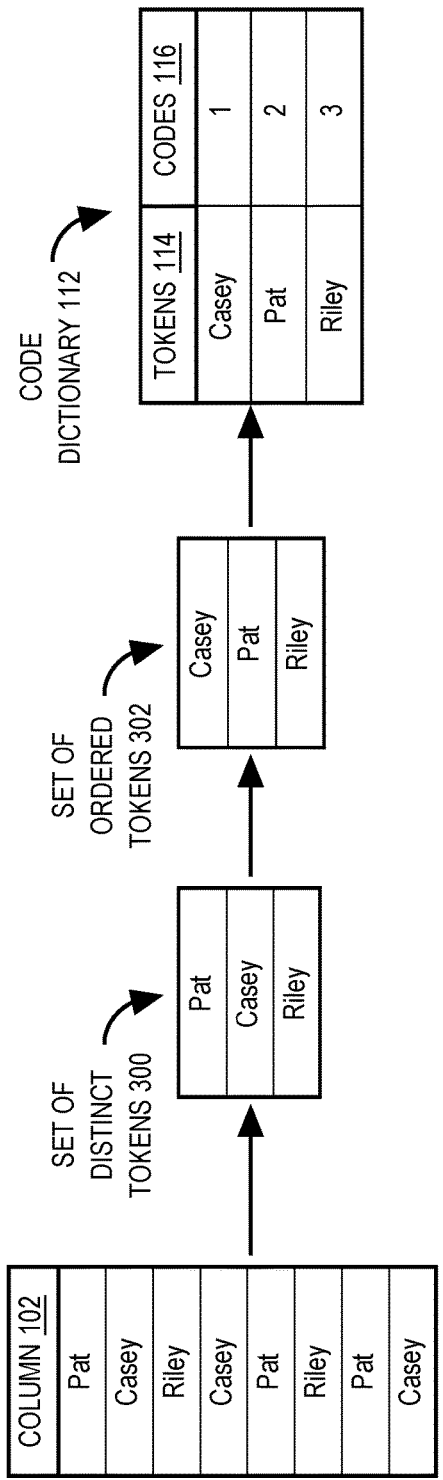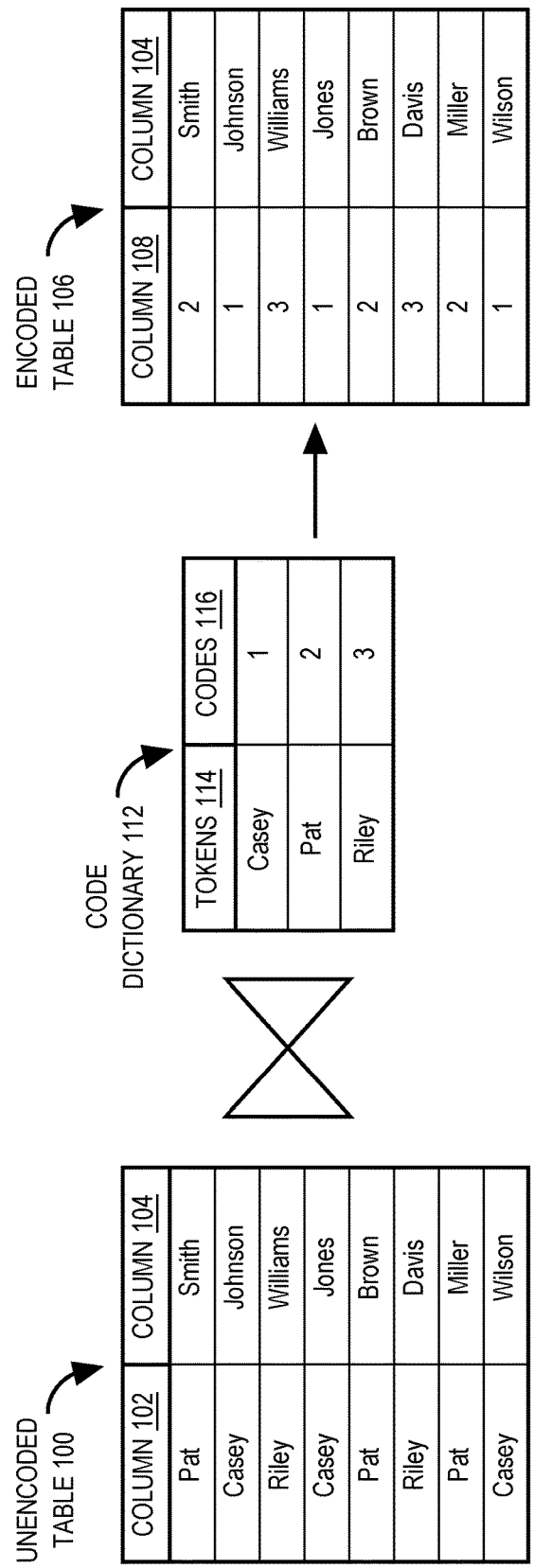
FIG. 3A
FIG. 3B

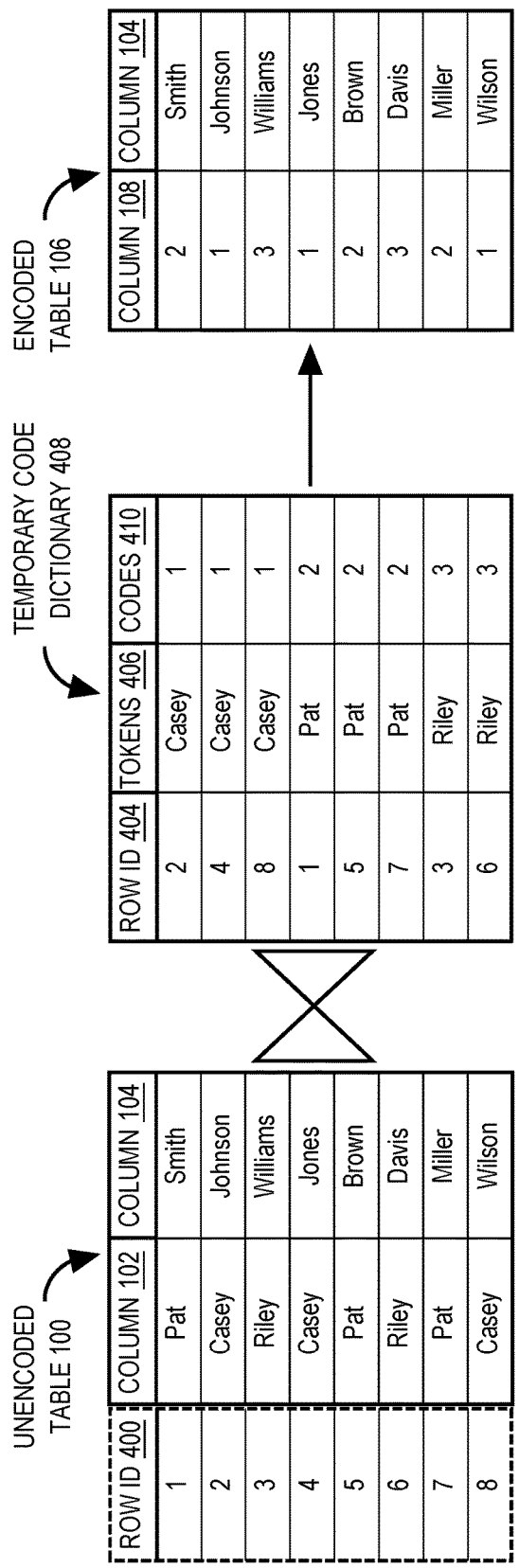
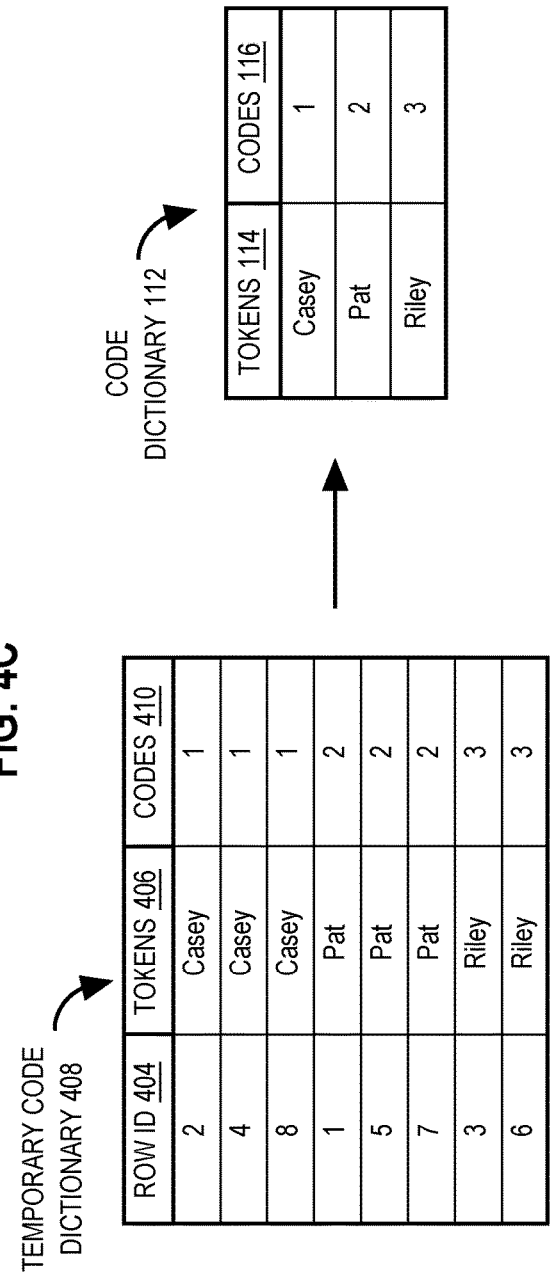
FIG. 4B
FIG. 4C

FIG. 5A

UNENCODED TABLE 100

| NODE ID 500 | COLUMN 102 | COLUMN 104 |
|---|---|---|
| 3 | Pat | Smith |
| 2 | Casey | Johnson |
| 3 | Riley | Williams |
| 2 | Casey | Jones |
| 1 | Pat | Brown |
| 1 | Riley | Davis |
| 2 | Pat | Miller |
| 3 | Casey | Wilson |

INTERMEDIATE TABLE 502

| NODE ID 504 | TOKENS 506 |
|---|---|
| 3 | Pat |
| 2 | Casey |
| 3 | Riley |
| 1 | Pat |
| 1 | Riley |
| 2 | Pat |
| 3 | Casey |

INTERMEDIATE TABLE 508

| NODE ID 510 | TOKENS 512 |
|---|---|
| 2 | Casey |
| 3 | Casey |
| 3 | Pat |
| 1 | Pat |
| 2 | Pat |
| 3 | Riley |
| 1 | Riley |

TEMPORARY CODE DICTIONARY 514

| NODE ID 510 | TOKENS 512 | CODES 516 |
|---|---|---|
| 2 | Casey | 1 |
| 3 | Casey | 1 |
| 3 | Pat | 2 |
| 1 | Pat | 2 |
| 2 | Pat | 2 |
| 3 | Riley | 3 |
| 1 | Riley | 3 |

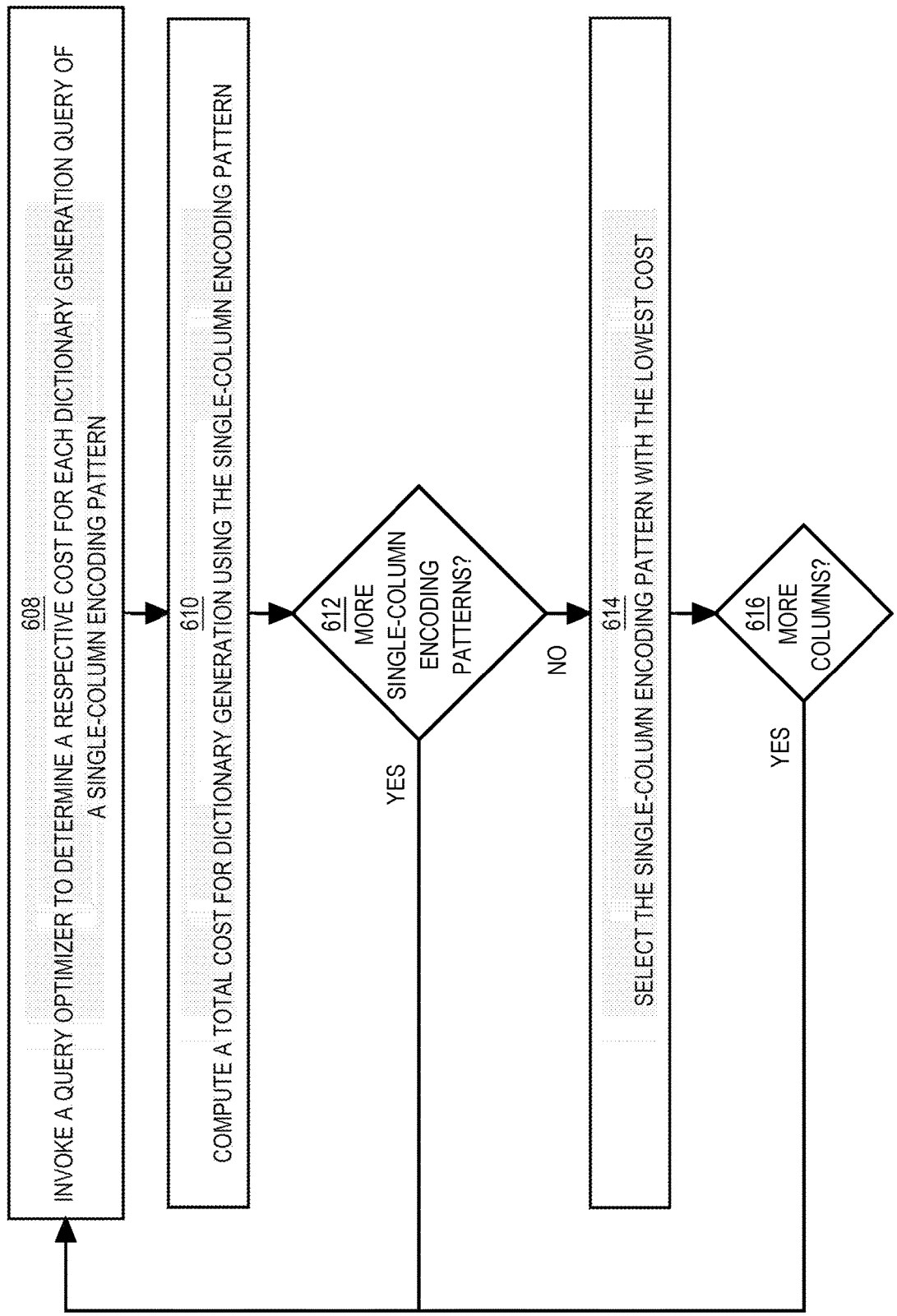

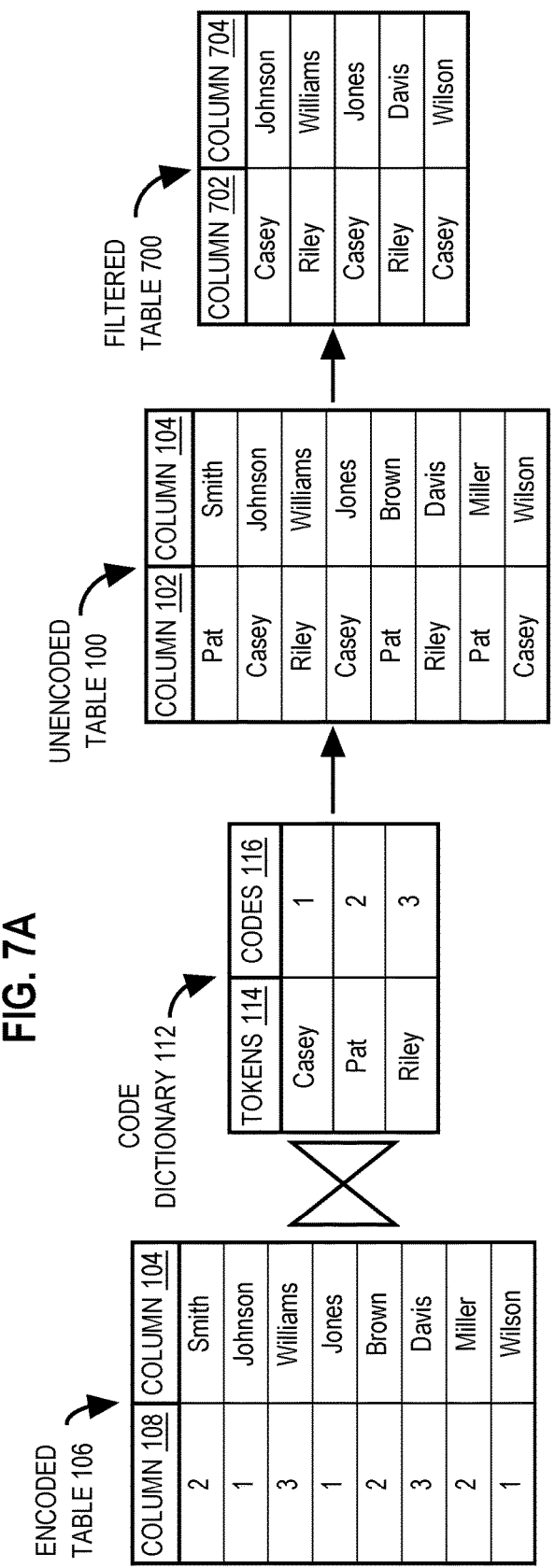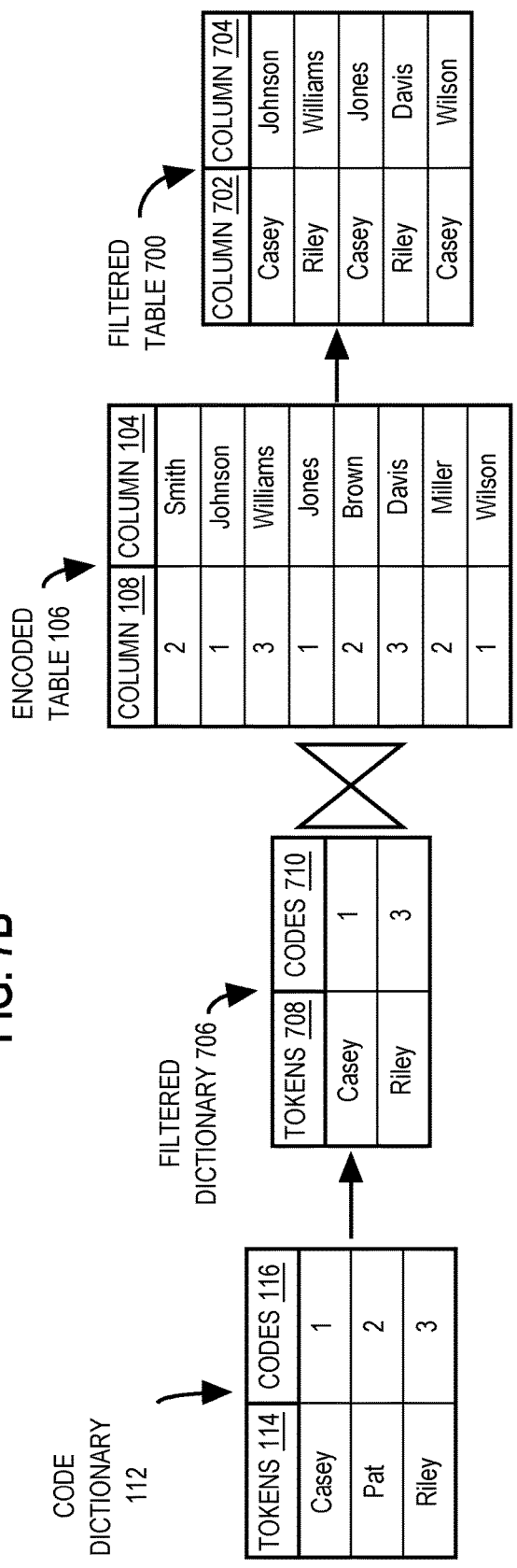

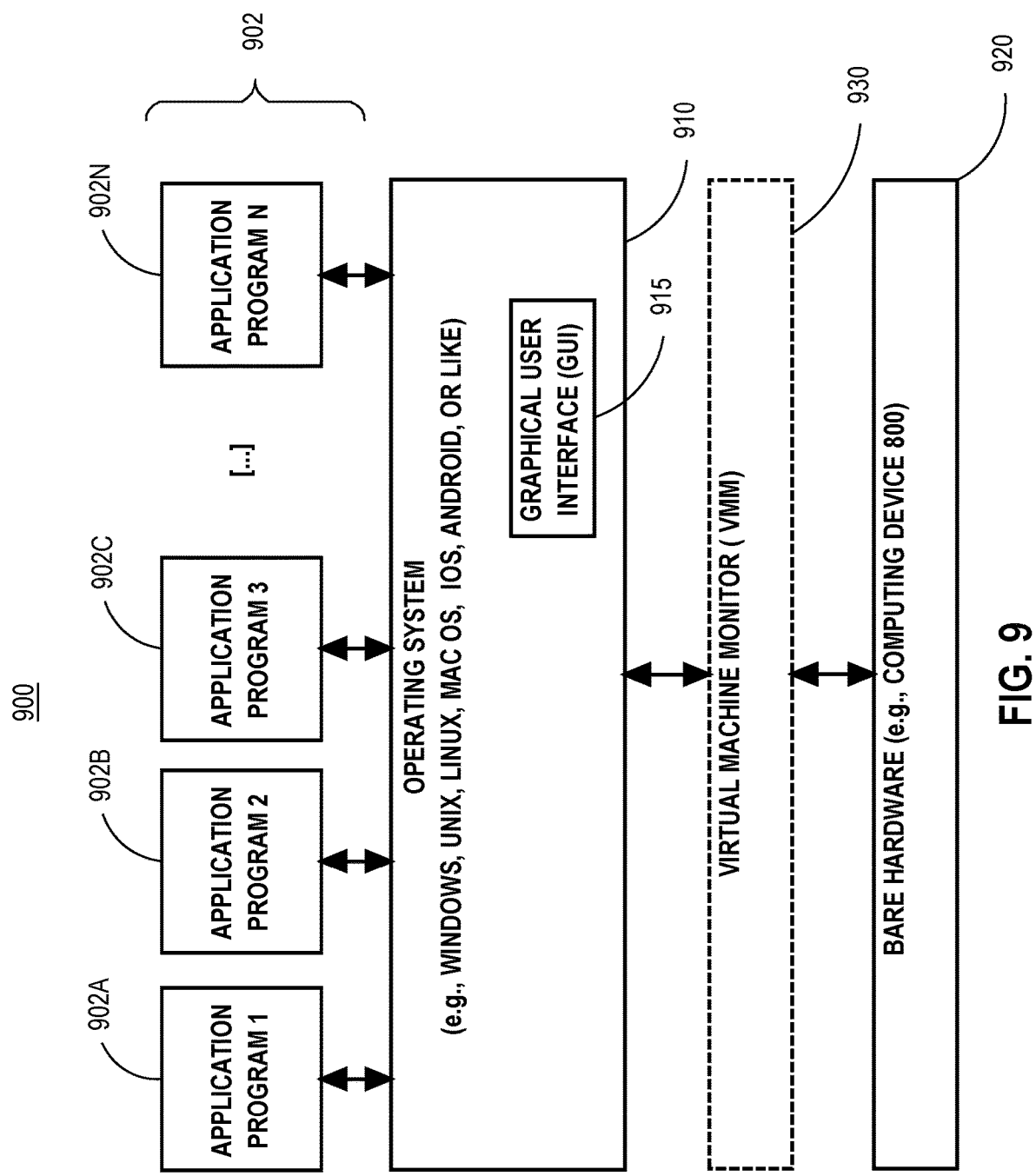

RELATIONAL DICTIONARIES

TECHNICAL FIELD

Embodiments are generally related to information storage and retrieval technology. More specifically, embodiments are related to relational dictionaries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DATABASE OVERVIEW

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a database management system (DBMS) by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

DICTIONARY COMPRESSION

Typically, a column of database data is stored in a compressed format to conserve space in memory. Often used is a lightweight compression technique known as "dictionary encoding", which enables data that comprises a relatively large number of bits to be represented by a relatively small number of bits. The relatively large number of bits corresponds to a value of database data and is hereinafter referred to as a "token". The relatively small number of bits corresponds to an encoded representation of the token and is hereinafter referred to as a "code". An example of a token is a string, and an example of a code is one memory word integer. Tokens and codes exhibit a one-to-one relationship with each other.

In the example of FIG. 1, column 102 comprises a set of database values in an uncompressed format, and column 108 comprises the set of database values in a compressed format. Tokens 114 comprise the uncompressed values of column 102, and codes 116 comprise the encoded representations of tokens 114. Advantageously, column 108 stores codes 116 instead of tokens 114, thereby achieving a significant savings in memory utilization. As such, column 108 can fit in relatively fast but small memory, such as dynamic random-access memory (DRAM), where queries can be executed against it relatively quickly.

Although FIG. 1 depicts tokens 114 and codes 116 as values of particular data types, it should be appreciated that the particular data types used may vary from implementation to implementation. However, to realize space savings, codes 116 preferably comprise fewer bits than tokens 114.

Among the costs of achieving the aforementioned space savings is the overhead of storing and maintaining mappings that enable translation between tokens and codes and vice versa. A token-to-code mapping enables compression of database data, such as when a database table is loaded into a database system; and a code-to-token mapping enables decompression of database data, such as when a query is evaluated over the database table. A token-to-code mapping is hereinafter referred to as an "encoding dictionary", and a code-to-token mapping is hereinafter referred to as a "decoding dictionary". Encoding dictionaries and decoding dictionaries are often maintained in relatively fast but small memory along with the compressed data with which they are associated. As used herein, a dictionary is said to be "for" or "associated with" database data if the dictionary is to be used for compressing and/or decompressing the database data.

Typically, an encoding dictionary and a decoding dictionary are implemented as separate structures. For example, an encoding dictionary may be implemented as a trie or a hash table, whereas a decoding dictionary may be implemented as an array of distinct tokens. This is because some structures are more suitable for encoding, whereas other structures are more suitable for decoding.

However, the overhead of storing and maintaining multiple structures is significantly higher than the overhead of storing and maintaining a single structure, which can involve incorporating updates, deletions, and insertions. Furthermore, the overhead of storing and maintaining multiple structures is even higher in a distributed database system, where each of the structures are either synchronized between database instances or partitioned across database instances.

ENCODING AND DECODING PROCESSES

Typically, encoding and decoding processes are hard-coded such that there is only one process for encoding and only one process for decoding. However, such hard-coded processes can result in inefficiencies, because they fail to consider different characteristics of different columns. In other words, such hard-coded processes take a "one-size-fits-all" approach that often wastes computing resources and scales poorly.

For example, a hard-coded encoding process may involve generating an encoding dictionary based on (1) sorting a set of tokens and then (2) removing duplicate tokens. Although the process may efficiently encode a column having a large number of distinct tokens, the process would inefficiently encode a column having a small number of distinct tokens. This is because a large number of duplicate tokens would be unnecessarily sorted.

However, tailoring encoding and decoding processes to table/column characteristics may involve a significant programming effort. For example, the existing DBMS infrastructure may have to be extensively modified to accommodate (1) a new program for determining table/column characteristics; (2) separate programs for each operation involved in an encoding/decoding process; and (3) a new program for determining, on a column-by-column basis, which operations to perform and when. Furthermore, the increased complexity of a modified DBMS infrastructure can introduce bugs, latency, and/or other issues that may necessitate further research for adequate resolution.

BRIEF DESCRIPTION OF THE DRAWINGS

In the drawings:
FIGS. 3A-B depict an example encoding pattern.
FIGS. 4A-C depict another example encoding pattern.
FIGS. 5A-C depict yet another example encoding pattern.
FIGS. 6A-B are flow diagrams that depict example approaches related to encoding multiple columns of database data.
FIGS. 7A-B depict example decoding patterns.
FIG. 9 depicts a software system for controlling the operation of the computer system.

Figure 1:
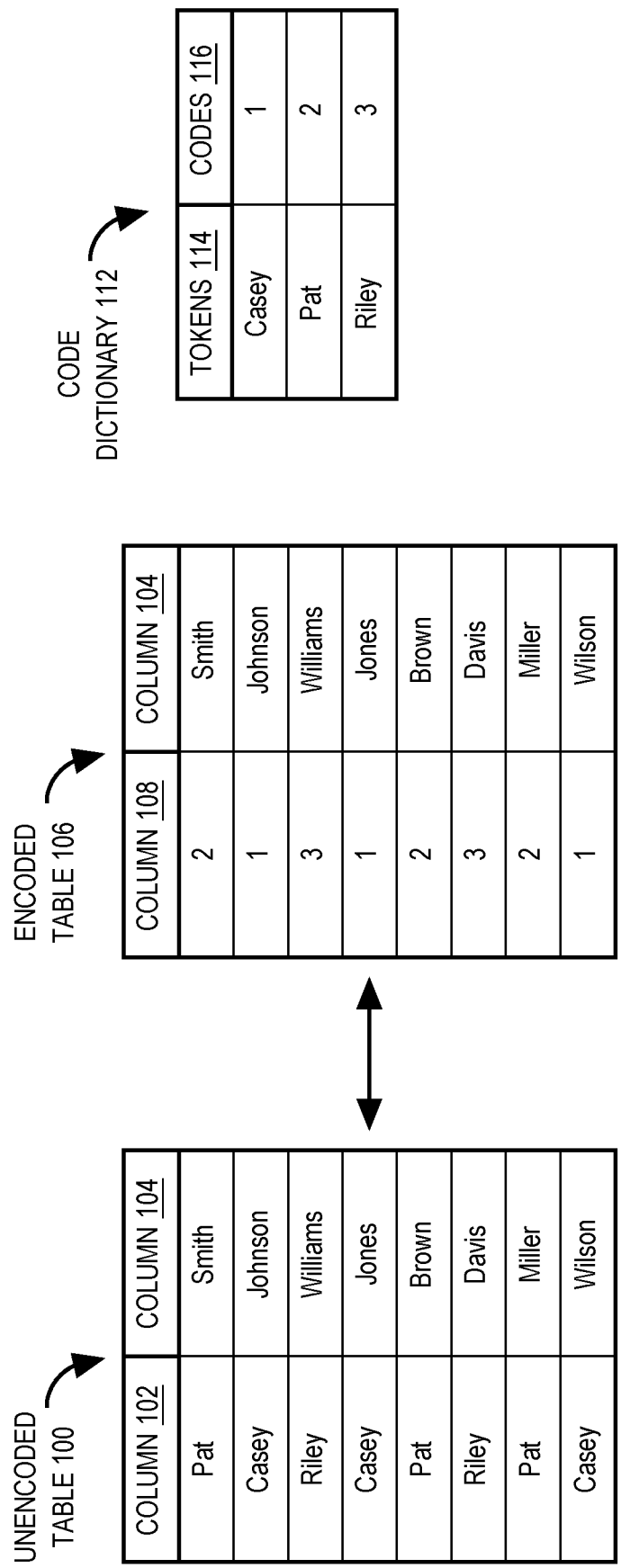
FIG. 1 depicts an example relational dictionary.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

Introduction

An encoding dictionary and a decoding dictionary can be consolidated into a single "relational" dictionary that can be used to encode as well as decode database data. A relational dictionary is a database table that stores a set of relationships between a set of tokens and a set of codes. Implementing a relational dictionary as a database table enables it to be referenced in queries and DDL statements. This means the query optimization framework of a DBMS can be leveraged to determine a more efficient way to generate a relational dictionary. In some embodiments, a relational dictionary and each of its columns are defined by a database dictionary.

Referring to FIG. 1, code dictionary 112 is an example relational dictionary that is implemented as a table having two columns—one for tokens 114 and one for codes 116. Each entry of code dictionary 112 stores a unique relationship between a token and a code. Logically, each relationship can be represented as a tuple comprising a code element and a token element. Thus, a relational dictionary can be logically represented as a set of tuples, wherein each tuple has the format "<token, code>".

Significantly, each entry of code dictionary 112 can be used for both encoding and decoding. This can be achieved based on join operations that rearrange, in effect, the order of tuple elements to be more suitable for the process at hand. For example, although a token column precedes a code column, decoding may involve treating the code column as if it preceded the token column. Advantageously, the overhead of storing and maintaining a relational dictionary is less than the overhead of storing and maintaining separate encoding and decoding dictionaries.

Furthermore, a relational dictionary enables encoding and decoding to be performed in a manner that is efficient and scales well. Instead of using the same hard-coded encoding and decoding processes for all columns, an optimal encoding/decoding process may be tailored for each column based on table and/or column characteristics. Advantageously, this can be achieved without a significant programming effort, because the relational nature of the dictionary is compatible with the existing DBMS infrastructure.

More specifically, determining an optimal encoding/decoding process involves leveraging the existing mechanisms for cost-based query rewrites. In the encoding/decoding context, performing query rewrites involves transforming (a) a database command that refers to one or more tables/views into (b) sets of database commands, wherein each set refers to one or more materialized views that are defined on the one or more tables/views. Each set of database commands is generated according to a different "encoding/decoding pattern". Each encoding/decoding pattern specifies a different sequence of operations, such as sorting, ranking, and joining. The encoding/decoding pattern having the lowest cost is determined to be the optimal encoding/decoding process.

A respective cost for each encoding/decoding pattern is determined based on aggregating the costs of the component database commands. A respective cost for each database command can be determined using a query optimizer, which is software that determines the most efficient plan for executing a database command.

Relational Dictionaries

As mentioned above, a relational dictionary can be used as both an encoding dictionary and a decoding dictionary. A relational dictionary stores a set of tuples, wherein each tuple maps a token to a code and vice versa. For example, the first entry of code dictionary 112 can be logically represented as the tuple "<Casey, 1>". Significantly, a tuple can be used for both encoding and decoding regardless of whether the tuple includes the token before the code or vice versa.

In the example of FIG. 1, code dictionary 112 is a relational dictionary that is implemented as a table having a code column and a token column. Database dictionary 112 comprises a set of tuples that maps a set of codes 116 to a set of tokens 114 stored in column 102 of unencoded table 100.

Unencoded table 100 comprises columns 102-104, which are columns of unencoded database data. As used herein, the term "unencoded" also encompasses the term "decoded".

In contrast, encoded table 106 comprises columns 104 and 108. Column 108 is a column of encoded database data.

As mentioned above, a relational dictionary can be used to generate encoded database data. This can be achieved based on joining unencoded database data with the relational dictionary. For example, to generate encoded table 106, unencoded table 100 may be joined with code dictionary 112.

Similarly, a relational dictionary can be used to generate decoded database data. This can be achieved based on joining encoded database data with the relational dictionary. For example, to generate unencoded table 100, encoded table 106 may be joined with code dictionary 112.

Notably, it was possible to use code dictionary 112 for decoding although a token precedes a code in each tuple of code dictionary 112. This is because a join operation can be implemented as a re-orderable join operation, such as an inner join operation. Thus, a query optimizer can change the join order as necessary.

In some embodiments, a relational dictionary is a "global dictionary". A global dictionary is associated with an entire column of a database table. For example, a column of a database table may be divided into chunks of 16 KB each, but all the chunks may share the same global dictionary. In other words, mappings between tokens and codes do not vary from chunk to chunk. As another example, a database table may be partitioned into shards of 16 GB each, and to spread load, each shard may be stored on a separate node of a "shared-nothing" cluster; however, for a particular column, all the nodes may share the same global dictionary. In other words, mappings between tokens and codes do not vary from node to node or from shard to shard.

In some embodiments, a relational dictionary is a "token-ordered dictionary". A token-ordered dictionary maintains tokens in a token order with the order of the codes mirroring the order of the respective tokens. For example, code dictionary 112 is a token-ordered dictionary. Tokens 114 are organized in a lexicographical order, and codes 116 are organized in an increasing order that mirrors the lexicographical order.

Advantageously, token-ordered dictionaries can be used to efficiently evaluate "range queries" over encoded database data. As used herein, a range query specifies an upper boundary and/or a lower boundary for a set of one or more values. An example range query is "SELECT * FROM table WHERE token column>'Pat'". According to code dictionary 112, the query predicate is satisfied by any code that is greater than "2". Thus, the example range query can be efficiently evaluated based on scanning column 108 for any codes that are greater than "2".

Encoding a Column of Database Data

As mentioned above, a relational dictionary enables leveraging the existing DBMS infrastructure to efficiently generate encoded database data. For the sake of clarity and ease of explanation, this section describes techniques related to encoding a single column and reserves discussion of techniques related to encoding multiple columns for a subsequent section.

Figure 2:
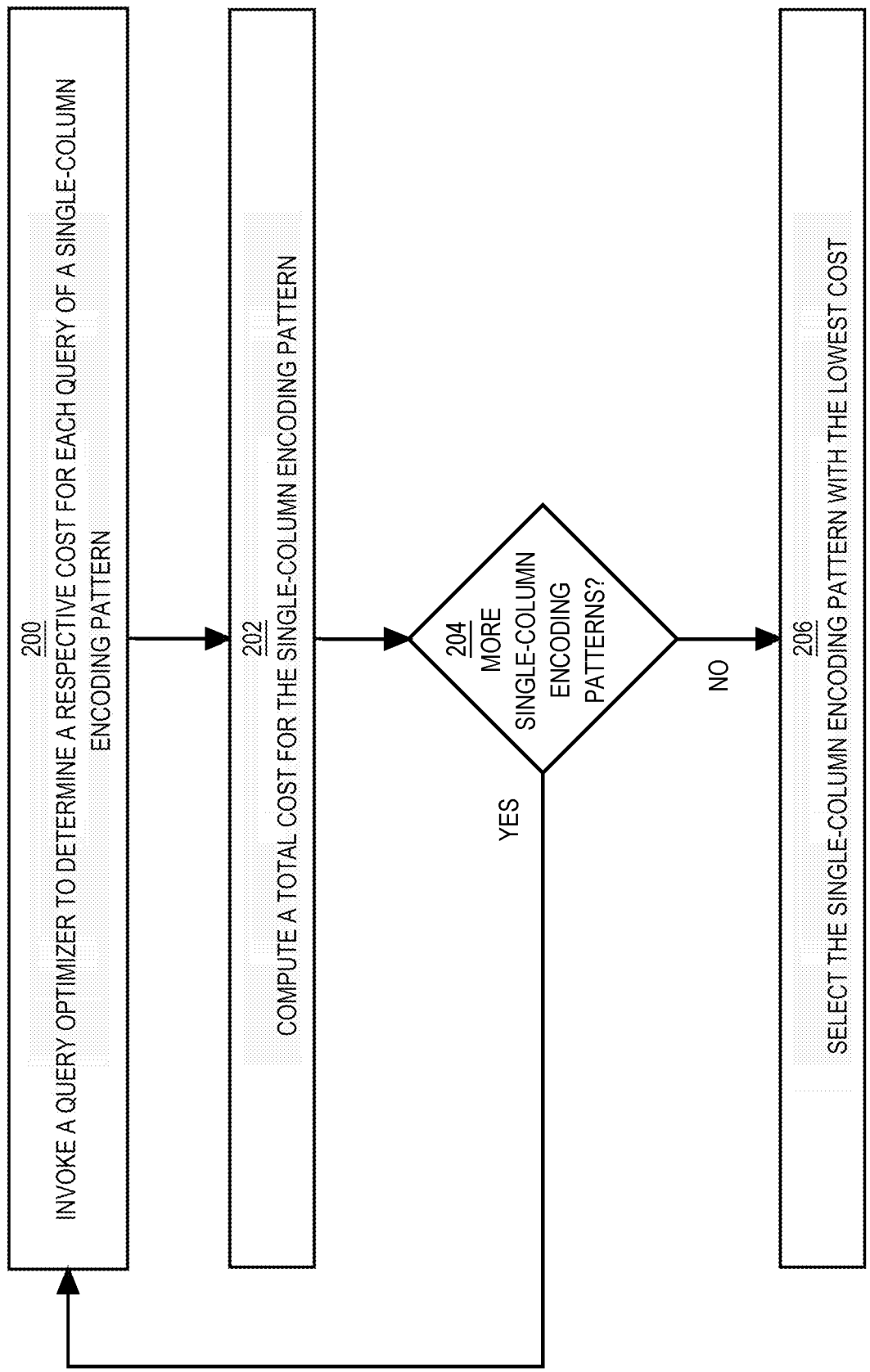
FIG. 2 is a flow diagram that depicts an example approach related to encoding a single column of database data.

FIG. 2 provides an example approach for determining an optimal encoding pattern. A stored procedure may be executed to cause one or more database servers of a database system to perform the example approach of FIG. 2. The stored procedure may be triggered by a database command specifying that database data is to be encoded. For example, a database command that includes an ALTER TABLE statement may be issued to a DBMS, and in response to receipt of the database command, the DBMS causes the stored procedure to be called.

The stored procedure is aware of multiple encoding patterns. Each encoding pattern specifies a different approach for encoding database data. Examples of different encoding patterns are provided in the subsections below. For a particular column of unencoded database data, the database command that triggered the stored procedure may be rewritten according to each of the predefined encoding patterns so that the encoding patterns can be compared.

Each encoding pattern may be carried out by a plurality of database queries, one or more of which cause generation of a code dictionary. As will be explained in greater detail below, generating a code dictionary may involve multiple database queries if a temporary version of the code dictionary is also to be generated. Each encoding pattern may also include a database query that joins unencoded database data with a code dictionary, temporary or otherwise.

In blocks 200-204, each encoding pattern is analyzed. For the sake of clarity and ease of explanation, FIG. 2 depicts an iterative process that includes blocks 200-204. However, in some embodiments, each encoding pattern is analyzed in parallel.

At block 200, the stored procedure invokes a query optimizer to determine a respective cost for each database query of an encoding pattern. For example, based on the characteristics of a particular column, the query optimizer may estimate that the cost for a query generating a dictionary will be "8" and that the cost for a query joining the dictionary with unencoded database data will be "3".

As used herein, cost values estimated by a query optimizer may not have any particular unit of measurement. Instead, the cost values may be a weighted value used to compare execution plans. For example, a cost value may be a function of central processing unit (CPU) cost and input/output (I/O) cost. CPU cost may be proportional to the number of clock cycles involved in an operation, and I/O cost may be proportional to the number of data blocks read by an operation.

At block 202, the stored procedure determines a total cost for the encoding pattern. This may be achieved based on aggregating the costs for the queries involved in the encoding pattern. For example, if the cost of a query generating a dictionary is "8" and the cost of a query joining the dictionary with unencoded database data is "3", then the cost of the encoding pattern would be "11".

At block 204, the stored procedure determines whether there are any other encoding patterns to be analyzed. If so, block 204 proceeds to block 200. Otherwise, block 204 proceeds to block 206.

At block 206, the stored procedure selects the encoding pattern having the lowest cost. This may involve comparing the costs of different encoding patterns to determine which encoding pattern has a lower cost than any other encoding pattern.

After block 206, the queries of the selected encoding pattern are executed to generate a code dictionary and to generate encoded database data. The code dictionary may be stored in any of a variety of ways. For example, the code dictionary may be defined by the database catalog or some other database dictionary. Notably, defining the code dictionary in some other database dictionary would prevent the code dictionary from being visible to users and thereby prevent the code dictionary from being referenced by users in queries.

In a distributed database system, the code dictionary may be replicated or partitioned across database nodes. Notably, the existing DBMS infrastructure can be used to determine whether to replicate or partition the code dictionary. For example, the code dictionary may be replicated if it stores a small number of distinct tokens.

Encoding Pattern I

FIGS. 3A-B depict an example encoding pattern hereinafter referred to as "Encoding Pattern I". Encoding Pattern I may be executed on a centralized database system or on a distributed database system. In some embodiments, Encoding Pattern I involves two database queries—one that generates a relational dictionary and one that joins unencoded database data with the relational dictionary.

FIG. 3A depicts the generation of a relational dictionary according to an example database query of Encoding Pattern I. The database query specifies a sequence of operations comprising (1) de-duplicating tokens, (2) sorting tokens, and (3) assigning codes to tokens.

Set of distinct tokens 300 is generated from column 102 of unencoded table 100 based on de-duplicating distinct values stored in column 102. For example, this can be achieved using the keyword "DISTINCT". This may involve copying tokens from column 102 into one or more temporary structures without copying any duplicate tokens. In some embodiments, the one or more temporary structures may collectively form a temporary column. The one or more temporary structures may be discarded after code dictionary 112 is generated.

Optionally, set of ordered tokens 302 may be generated based on sorting set of distinct tokens 300. For example, this can be achieved using the keywords "ORDER BY". Significantly, generating set of ordered tokens 302 enables generation of a token-ordered dictionary.

Database dictionary 112 is generated based on assigning codes 116 to tokens 114. For example, this can be achieved based on performing the ranking function "RANKO" on set of distinct tokens 300 or set of ordered tokens 302. In the example of FIG. 3A, the first token "Casey" is assigned a rank of "1", the second token "Pat" is assigned a rank of "2", and the third token "Riley" is assigned a rank of "3".

Advantageously, de-duplicating tokens prior to assigning codes can reduce the cost of assigning codes. This is because avoiding duplicate tokens can reduce the number of tokens on which to perform code assignment. The cost savings increases as the size of set of distinct tokens 300 becomes smaller relative to the size of column 102. Thus, Encoding Pattern I is favorable for columns having a relatively low number of distinct values.

Provided below is an example of a query that generates a dictionary table.
CREATE TABLE dictionary AS (SELECT RANK( ) OVER (ORDER BY token_column) AS token_column, code_column FROM (SELECT DISTINCT token_column FROM unencoded_table) AS temporary_token_column)

FIG. 3B depicts unencoded database data that is joined with a relational dictionary according to an example database query of Encoding Pattern I. More specifically, encoded table 106 is generated based on performing an equijoin on column 102 of unencoded table 100 and tokens 114 of code dictionary 112.

Provided below is an example of a query that joins the dictionary table with an unencoded database table.
CREATE TABLE encoded_table AS (SELECT t . . . , d.code_column AS token_column FROM unencoded_table t, dictionary d WHERE t.token_column=d.token_column)
Notably, "t . . . " denotes the projection on all columns of the unencoded database table except for the column that is to be encoded.

However, the cost of performing the join operation of Encoding Pattern I can be significant. This is because the join operation is performed on tokens, which are often implemented as variable-length data types that can be large in size. In addition to the overhead of carrying around the potentially large tokens, the join operation of Encoding Pattern I may also entail carrying around the values of other columns, such as column 104.

Furthermore, variable-length data types can make it difficult to execute Encoding Pattern I on a distributed database system. This is because partitioning on variable-length data types can be problematic. In particular, miscalculating statistics can result in a memory overflow. For example, all tokens that begin with "A" may be distributed to a particular database node, but if it turns out that those tokens are very long, then they may not fit in the memory of the particular database node.

Encoding Pattern II

Figure 4A:
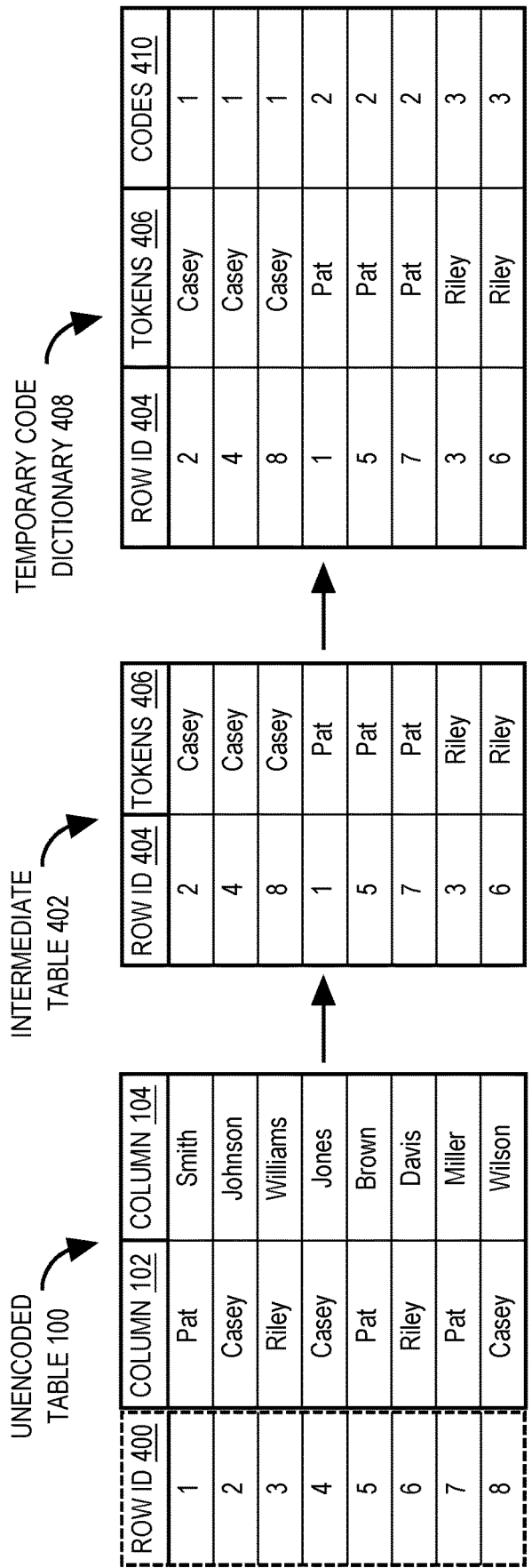

FIGS. 4A-C depict an example encoding pattern hereinafter referred to as "Encoding Pattern II". Compared to Encoding Pattern I, Encoding Pattern II has a lower cost of performing the join operation. However, Encoding Pattern II also has a higher cost of assigning codes to tokens.

Encoding Pattern II may be executed on a centralized database system or on a distributed database system. In some embodiments, Encoding Pattern II involves three database queries: one that generates a temporary relational dictionary, one that joins unencoded database data with the temporary relational dictionary, and one that generates a "persistent" relational dictionary based on the temporary relational dictionary. As used herein, a persistent dictionary is a dictionary that is retained in memory even after execution of the encoding pattern that created it.

FIG. 4A depicts the generation of a temporary relational dictionary according to an example database query of Encoding Pattern II. The database query specifies a sequence of operations comprising (1) sorting tokens and (2) assigning codes to tokens.

A set of ordered tokens 406 may be generated based on sorting tokens stored in column 102. As in Encoding Pattern I, sorting tokens is optional but has the benefit of enabling generation of a token-ordered dictionary. Sorting tokens may involve copying tokens from column 102 into one or more temporary structures in which they are sorted. In some embodiments, the one or more temporary structures may collectively form intermediate table 402.

Temporary code dictionary 408 may be generated based on assigning codes 410 to ordered or unordered tokens. Notably, temporary code dictionary 408 includes duplicate tokens. As will be described in greater detail below, duplicate tokens are tolerated in order to preserve row identifiers.

However, assigning the same code to duplicate tokens may cause generation of sparse codes. For example, in the set of ordered tokens 406, there are three instances of the token "Casey". RANK( ) would effectively treat the situation as a three-way tie for first place, which means that there can be no second or third place. Thus, RANK( ) would consider the next available rank to be "4", thereby creating a gap between the codes "1" and "4".

Optionally, to avoid generating sparse codes, a different operation may be used to assign codes to tokens. For example, the window function "DENSE RANK( )" may be performed on the set of ordered tokens 406 as depicted in FIG. 4A. Although there are three instances of the token "Casey", DENSE RANK( ) would consider the next available rank to be "2", thereby avoiding creation of any gaps between dictionary codes.

Temporary code dictionary 408 further comprises a physical column that stores row identifiers 404. Thus, temporary code dictionary 408 can be logically represented as a set of tuples having the format "<row identifier, token, code>". The physical column is derived from a "virtual" column of unencoded table 100 that stores row identifiers 400. In other words, row identifiers 400 are not actually stored in unencoded table 100. As will be described in greater detail below, row identifiers 400, 404 enable reducing the cost of performing join operations.

Row identifiers 400, 404 contain information for locating a row in a database. The information may include a file number, a data block number, a position of the row in a data block, and/or a data object number. For the sake of clarity and ease of explanation, FIG. 4A depicts row identifiers 400, 404 as single-digit numbers. However, in reality, row identifiers 400, 404 may be implemented as multi-digit numbers.

In unencoded table 100, each of row identifiers 400 exhibits a correspondence with a respective token of column 102 in that each of row identifiers 400 uniquely identifies a database row that stores the respective token. Such correspondences are maintained in derivative tables, such as intermediate table 402 and/or temporary code dictionary 408. For example, the row identifier "1" corresponds to the first instance of the token "Pat" in each of unencoded table 100, intermediate table 402, and temporary code dictionary 408.

As mentioned above, duplicate tokens are tolerated in order to preserve row identifiers. Multiple instances of the same token can correspond to different row identifiers. Thus, removing duplicate tokens would have the undesirable effect of removing some row identifiers. As will be described in greater detail below, each row identifier plays a significant role in Encoding Pattern II as a join key.

In some embodiments, a temporary relational dictionary stores primary keys instead of row identifiers. Doing so can further reduce the cost of Encoding Pattern II, because a primary key typically has a smaller size than a row identifier. For example, a primary key may be four bytes, whereas a row identifier may be eight bytes.

Provided below is an example of a query that generates a temporary dictionary table.

CREATE TABLE temporary_dictionary AS (SELECT DENSE_RANK( ) OVER (ORDER BY token_column) AS row_id_column, token_column, code_column FROM unencoded_table)

FIG. 4B depicts a temporary relational dictionary being used to generate encoded database data according to a database query of Encoding Pattern II. More specifically, encoded table 106 is generated based on performing an equijoin on row identifiers 400 of unencoded table 100 and row identifiers 404 of temporary code dictionary 408.

As mentioned above, a row identifier uniquely identifies the contents of a database row. Thus, it is unnecessary to incur the overhead of carrying around the contents of corresponding database rows when joining on row identifiers. For example, carrying around the contents of columns 102-104 is unnecessary when joining on row identifiers 400, 404. Accordingly, the join operation of Encoding Pattern II costs less than the join operation of Encoding Pattern I.

Provided below is an example of a query that joins the temporary dictionary table with an unencoded database table.

CREATE TABLE encoded_table AS (SELECT t . . . , d.code column AS token_column FROM unencoded_table t, temporary_dictionary d WHERE t.row_id=d.row_id)

Notably, "t . . . " denotes the projection on all columns of the unencoded database table except for the column that is to be encoded.

FIG. 4C depicts the generation of a persistent relational dictionary according to a database query of Encoding Pattern II. More specifically, code dictionary 112 is generated based on de-duplicating tokens 406 stored in temporary code dictionary 408. Thereafter, temporary code dictionary 408 may be discarded.

As mentioned above, duplicate tokens are tolerated in order to preserve row identifiers, which serve as join keys. However, row identifiers become irrelevant after the join operation is performed. Thus, row identifiers and duplicate tokens can be removed after the join operation is performed.

Provided below is an example of a query that generates a persistent dictionary table from a temporary dictionary table.

CREATE TABLE dictionary AS (SELECT DISTINCT token_column, code_column FROM temporary_dictionary)

Encoding Pattern II is particularly favorable for tables having many columns that store large amounts of data. As mentioned above, row identifiers uniquely identify the contents of these columns, so it is unnecessary to carry around these columns when joining on row identifiers.

Encoding Pattern III

Figure 5B:
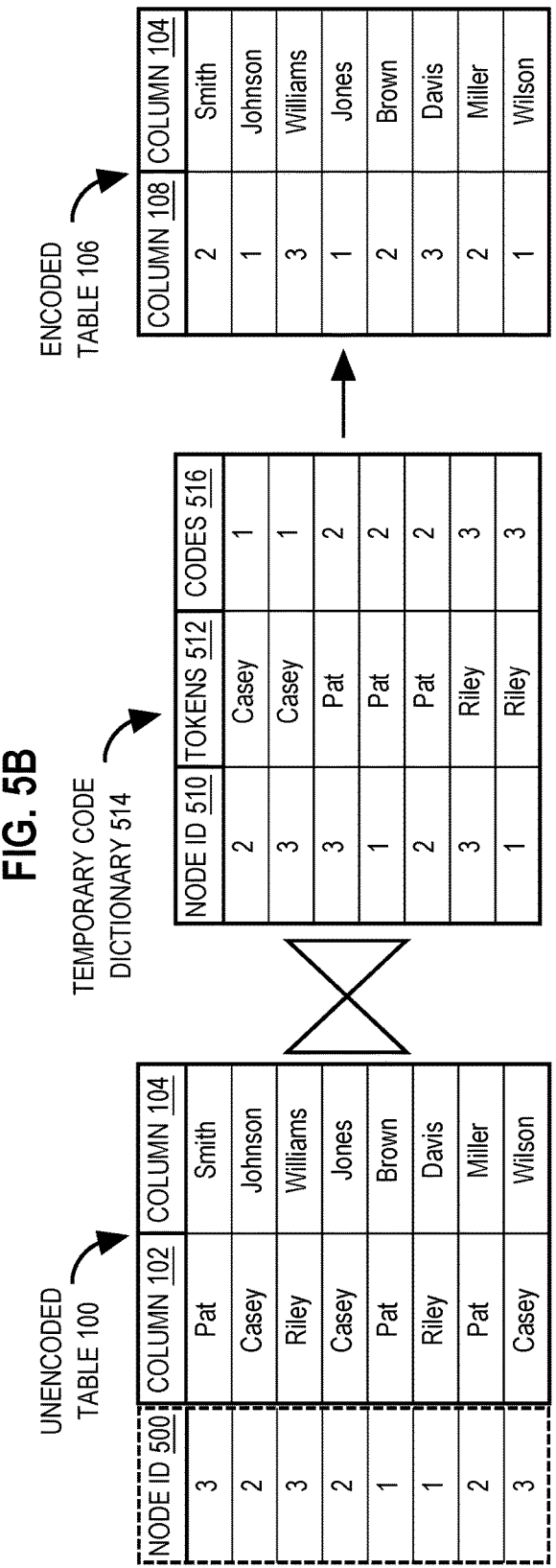
Figure 5C:
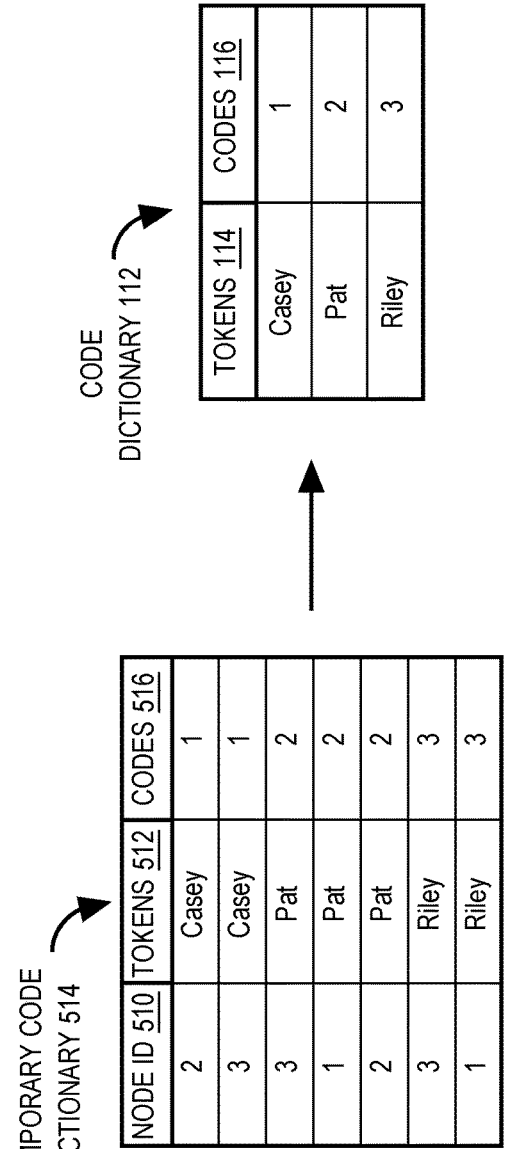

FIGS. 5A-C depict an example encoding pattern hereinafter referred to as "Encoding Pattern III". In some embodiments, Encoding Pattern III involves three database queries: one that generates a temporary relational dictionary, one that joins unencoded database data with the temporary relational dictionary, and one that generates a persistent relational dictionary based on the temporary relational dictionary.

Advantageously, Encoding Pattern III leverages a distributed database system to efficiently perform join operations involving tokens as join keys. More specifically, Encoding Pattern III involves multiple "local" join operations that have a lower aggregate cost than a single "global" join operation. As used herein, a local operation is performed at the database node level, whereas a global operation is performed at the database system level. Each database node can be a storage node and/or a processing node of a distributed database system. For example, in a "shared-nothing" architecture, each database node is both a storage node and a processing node.

In some embodiments, performing local join operations involves partitioning a temporary relational dictionary across a plurality of database nodes. However, Encoding Pattern III avoids partitioning the temporary relational dictionary on tokens. As mentioned above, tokens are often implemented as variable-length data types, which can cause a memory overflow when distributed across a plurality of database nodes. Instead, Encoding Pattern III enables partitioning the temporary relational dictionary to correspond with pre-existing partitions of unencoded database data. For example, if two database nodes store the token "Pat", then Encoding Pattern III partitions the temporary relational dictionary such that each of the two database nodes receives a dictionary entry comprising the token "Pat".

This can be achieved by partitioning the temporary relational dictionary on storage location instead of tokens. The row identifiers of a distributed database system may further comprise storage node identifiers, such as node identifiers 500, 504, 510 of FIG. 5A. Thus, storage node identifiers can be extracted from row identifiers based on a function such as "EXTRACT_STORAGE_NODE_ID(row_id)". In the example of FIG. 5A, node identifiers 500 are extracted from a virtual column of row identifiers for unencoded table 100.

Each storage node identifier uniquely identifies a respective node that stores a corresponding database row. For example, in unencoded table 100, the node identified with "3" stores the database row containing "Pat" and "Smith", the node identified with "2" stores the database row containing "Casey" and "Johnson", and so forth.

Node identifiers are stored in a physical column of the temporary relational dictionary. Thus, the temporary relational dictionary can be logically represented as a set of tuples having the format "<node identifier, token, code>". This enables the temporary relational dictionary to be partitioned on the node identifiers, not on tokens.

FIG. 5A depicts the generation of a temporary relational dictionary according to an example database query of Encoding Pattern III. The database query specifies a sequence of operations comprising (1) locally de-duplicating tokens, (2) sorting tokens, and (3) assigning codes to tokens.

Unencoded table 100 stores unencoded database data that is partitioned across a plurality of storage nodes. Node identifiers 500 indicate which nodes store which database rows.

A set of locally distinct tokens 506 is generated based on locally de-duplicating tokens stored in column 102 of unencoded table 100. At the database system level, duplicate tokens can be tolerated so long as each duplicate token is stored on a different node. Thus, duplicate tokens that are stored on the same node undergo de-duplication.

Referring to FIG. 5A, there are three instances of the token "Pat" in column 102; however, de-duplication is unnecessary, because each of them corresponds to a different node identifier. In contrast, there are two instances of the token "Casey" that correspond to the node identifier "2"; thus, they are de-duplicated.

Local de-duplication may involve copying tokens from column 102 into one or more temporary structures without copying any duplicate tokens that are stored on the same node. In some embodiments, the one or more temporary structures may collectively form intermediate table 502, which comprises a physical column that stores node identifiers 504. The one or more temporary structures may be discarded after temporary code dictionary 514 is generated.

Optionally, a set of ordered tokens 512 may be generated based on sorting the set of locally distinct tokens 506. Sorting may be performed on a single node in a centralized manner or across a plurality of nodes in a distributed manner. In FIG. 5A, intermediate table 508 is a token-ordered version of intermediate table 502. Thus, depending on the manner in which it is generated, intermediate table 508 may comprise one or more temporary structures.

Temporary code dictionary 514 may be generated based on assigning codes 516 to ordered or unordered tokens. Notably, temporary code dictionary 514 may include duplicate albeit locally distinct tokens. As will be described in greater detail below, the duplicate albeit locally distinct tokens enable local join operations.

However, assigning the same code to duplicate tokens may cause generation of sparse codes. Thus, in some embodiments, Encoding Pattern III involves an operation, such as "DENSE_RANK( )", that assigns codes to tokens without creating any gaps between dictionary codes.

Provided below is an example of a query that generates a temporary dictionary table.
CREATE TABLE temporary_dictionary AS (SELECT_DENSE_RANK( ) OVER (ORDER BY token_column) AS node_id_column, token_column, code_column FROM (SELECT DISTINCT EXTRACT_STORAGE_NODE_ID(row_id) AS node_id_column, token_column FROM unencoded_table) AS temporary_table)

FIG. 5B depicts a temporary relational dictionary being used to generate encoded database data according to a database query of Encoding Pattern III. More specifically, encoded table 106 is generated based on performing an equijoin on at least column 102 of unencoded table 100 and tokens 512 of temporary code dictionary 514. In some embodiments, the equijoin is also performed on node identifiers 500 of unencoded table 100 and node identifiers 510 of temporary code dictionary 514.

For example, if temporary code dictionary 514 has a relatively small size, a query optimizer may determine that temporary code dictionary 514 should be replicated and provided to each processing node. Each processing node may perform a local join operation involving the tokens stored on a respective storage node. In other words, a first processing node may perform a local join operation involving the tokens stored on a first storage node, a second processing node may perform a local join operation involving the tokens stored on a second storage node, and so forth. To filter for dictionary entries associated with the tokens stored on a particular storage node, the local join operation may be performed on both tokens and node identifiers.

In another example, if temporary code dictionary 514 has a relatively large size, a query optimizer may determine that temporary code dictionary 514 should be partitioned and distributed across a plurality of processing nodes. However, the physical column of node identifiers 510 may provide the query optimizer with a hint that temporary code dictionary 514 should be partitioned on node identifiers 510 instead of tokens 512. Thus, all dictionary entries having a first node identifier may be sent to a first processing node, all dictionary entries having a second node identifier may be sent to a second processing node, and so forth. Each processing node may perform a local join operation involving the tokens stored on a respective storage node. Since the dictionary entries are already filtered, the local join operation may be performed on tokens alone.

Provided below is an example of a query that joins the temporary dictionary table with an unencoded database table.
CREATE TABLE encoded_table AS (SELECT t . . . , d.code_column AS token_column FROM unencoded_ table t, temporary_dictionary d WHERE t.token_column=d.token_column AND EXTRACT_STORAGE_NODE_ID(t.row_id)=d.node_id_column)
Notably, "t . . . " denotes the projection on all columns of the unencoded database table except for the column that is to be encoded.

FIG. 5C depicts the generation of a persistent relational dictionary according to a database query of Encoding Pattern III. More specifically, code dictionary 112 is generated by performing a global de-duplication on tokens 512 stored in temporary code dictionary 514. Thus, tokens 114 are globally distinct. Thereafter, temporary code dictionary 514 may be discarded.

As mentioned above, duplicate albeit locally distinct tokens are tolerated in order to enable local join operations. However, node identifiers become irrelevant after the local join operations are performed. Thus, node identifiers and duplicate tokens can be removed after the local join operations are performed.

Depending on whether temporary code dictionary 514 is distributed or replicated across a plurality of database nodes, the global de-duplication may be performed on a single node or on each node. If temporary code dictionary 514 is distributed across a plurality of nodes, temporary code dictionary 514 may be merged into a single structure on a single node for global de-duplication. However, if temporary code dictionary 514 is replicated across a plurality of database nodes, temporary code dictionary 514 may undergo global de-duplication on each node.

Encoding Multiple Columns of Database Data

As mentioned above, a stored procedure may be executed to cause one or more database servers of a database system to determine an optimal encoding pattern. In some embodiments, the stored procedure is triggered by a database command specifying that multiple columns of database data are to be encoded. In such embodiments, the stored procedure causes determination of an optimal multi-column encoding pattern.

For each column of database data that is to be encoded, a multi-column encoding pattern comprises one or more database queries that generate a relational dictionary. Assume for the sake of illustration that two columns are to be encoded. A multi-column encoding pattern would comprise (1) one or more database queries that generate a first relational dictionary for a first column and (2) one or more database queries that generate a second relational dictionary for a second column. Whether one database query or multiple database queries are used to generate a relational dictionary depends on which of the aforementioned single-column encoding patterns is incorporated into the multi-column encoding pattern.

For example, a multi-column version of Encoding Pattern I may comprise the following database queries:
CREATE TABLE first_dictionary AS (SELECT RANK( ) OVER (ORDER BY first_token_column) AS first_ code_column, first_token_column AS token_column FROM (SELECT DISTINCT first_token_column FROM unencoded_table) AS temporary_token_column)
CREATE TABLE second_dictionary AS (SELECT RANK( ) OVER (ORDER BY second_token_column) AS second_code_column, second_token_column AS token_column FROM (SELECT DISTINCT second_ token_column FROM unencoded_table) AS temporary_token_column)

A multi-column encoding pattern further comprises a database query that joins unencoded database data with a plurality of relational dictionaries, temporary or otherwise. For example, a multi-column version of Encoding Pattern I may comprise the following database query:
CREATE TABLE encoded_table AS (SELECT t.primary key, d1.code_column AS first_token_column, d2.code column AS second_token_column FROM unencoded_table t, first_dictionary d1, second_dictionary d2 WHERE t.first_token_column=d1.token_column AND t.second_token_column=d2.token_column)

Advantageously, instead of separate database queries that each join unencoded database data with a different relational dictionary, there can be a single database query that concurrently joins the unencoded database data with multiple relational dictionaries, thereby reducing overhead.

Selecting from a Plurality of Multi-Column Encoding Patterns

In some embodiments, the stored procedure is aware of more than one multi-column encoding pattern. In such embodiments, each multi-column encoding pattern incorporates one of the single-column encoding patterns described above. The database command that triggered the stored procedure may be rewritten according to each of the predefined multi-column encoding patterns so that the multi-column encoding patterns can be compared.

Figure 6A:
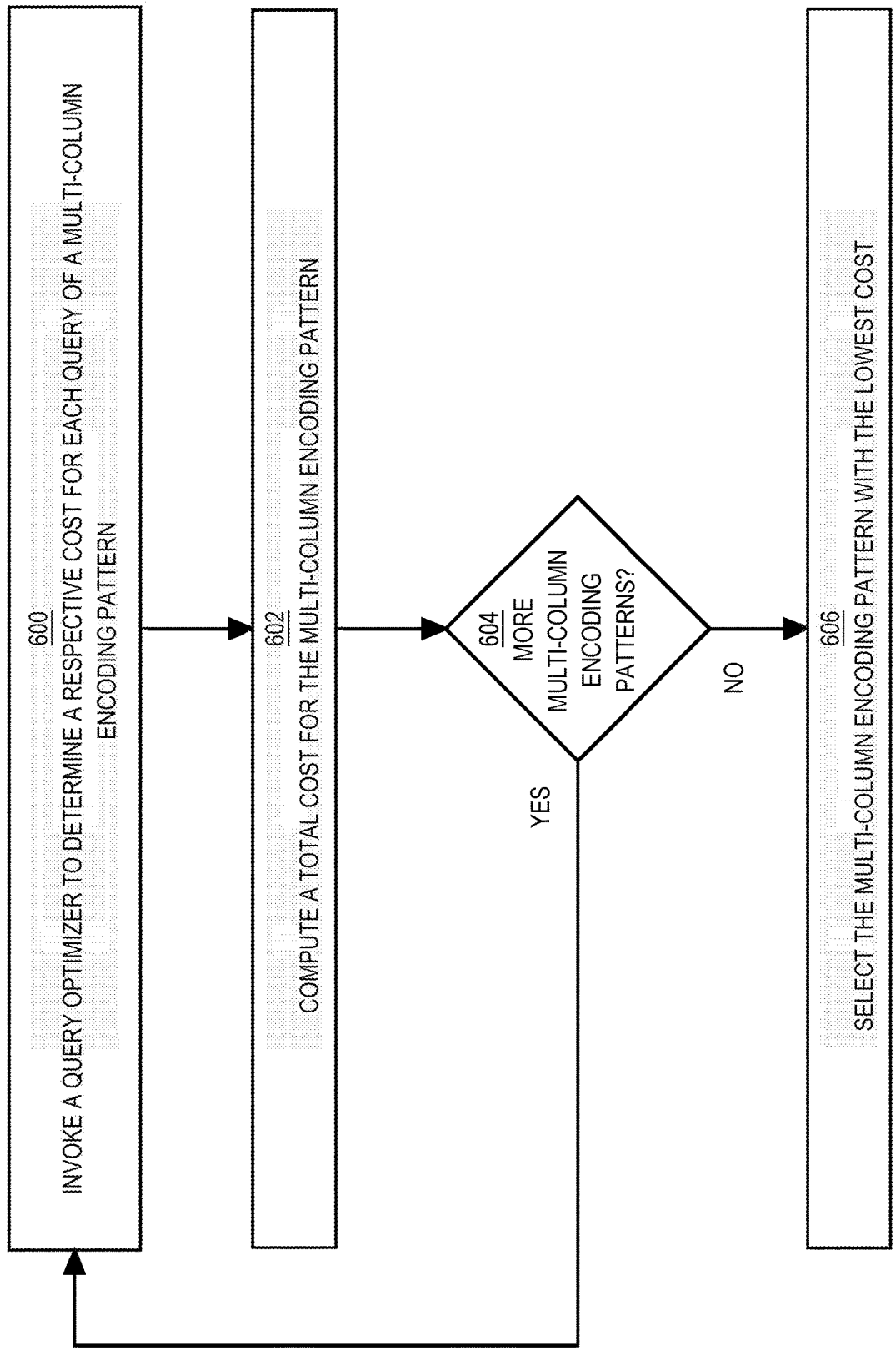

FIG. 6A depicts an example approach that can be performed by a stored procedure to determine an optimal multi-column encoding pattern in which the same single-column encoding pattern is applied to each column. In blocks 600-604, each multi-column encoding pattern is analyzed. For the sake of clarity and ease of explanation, FIG. 6A depicts an iterative process that includes blocks 600-604. However, in some embodiments, each multi-column encoding pattern is analyzed in parallel.

At block 600, the stored procedure invokes a query optimizer to determine a respective cost for each database query of a multi-column encoding pattern. For example, based on the characteristics of a first column, the query optimizer may estimate that the cost for a query generating a dictionary for the first column will be "8". Based on the characteristics of a second column, the query optimizer may also estimate that the cost for a query generating a dictionary for the second column will be "3". Furthermore, the query optimizer may estimate that the cost for a query concurrently joining unencoded database data with each dictionary will be "5".

At block 602, the stored procedure determines a total cost for the multi-column encoding pattern. This may be achieved based on aggregating the costs for the queries involved in the multi-column encoding pattern. Continuing with the example above, the cost of the multi-column encoding pattern would be "16".

At block 604, the stored procedure determines whether there are any other multi-column encoding patterns to be analyzed. If so, block 604 proceeds to block 600. Otherwise, block 604 proceeds to block 606.

At block 606, the stored procedure selects the multi-column encoding pattern having the lowest cost. This may involve comparing the costs of different multi-column encoding patterns to determine which encoding pattern has a lower cost than any other multi-column encoding pattern.

After block 606, the queries of the selected multi-column encoding pattern are executed to generate multiple code dictionaries and to generate encoded database data. As mentioned above, the code dictionaries may be stored in any of a variety of ways. Furthermore, in a distributed database system, the existing DBMS infrastructure can be used to determine whether to replicate or partition each code dictionary.

In the example approach of FIG. 6A, each multi-column encoding pattern applies the same single-column encoding pattern to each of the columns to be encoded. However, different columns may have different characteristics. Thus, a particular single-column encoding pattern may be efficient for one column but inefficient for another column.

Customizing a Multi-Column Encoding Pattern

In some embodiments, the stored procedure determines a multi-column encoding pattern in which different relational dictionaries can be generated according to different single-column encoding patterns. Significantly, this approach considers the characteristics of different columns.

However, such an approach can result in an exponential increase in computational overhead. If m represents the number of single-column encoding patterns and n represents the number of columns to be encoded, then the stored procedure would compare the costs of $m^n$ combinations of single-column encoding patterns.

In some embodiments, the increase is mitigated based on ignoring the cost of the query that joins the unencoded database data with the plurality of relational dictionaries. Notably, this query can incorporate a plurality of single-column encoding patterns. For example, the query can join an unencoded database table with a first dictionary on tokens, with a second dictionary on row identifiers, and a third dictionary on both node identifiers and tokens. Thus, differences in the cost of this query may be small relative to differences in the costs of the dictionary generation queries.

In some embodiments, the increase is mitigated based on comparing the costs of single-column encoding patterns for each column individually, not the costs of multi-column encoding patterns for all columns collectively. For example, instead of determining the most efficient combination of single-column encoding patterns for all columns, the most efficient single-column encoding pattern for a first column is determined separately from the most efficient single-column encoding pattern for a second column. Thus, the stored procedure would compare the costs of m×n combinations of single-column encoding patterns. Advantageously, this approach avoids wasting computing resources to consider combinations in which the most efficient single-column encoding pattern for a particular column is not applied to the particular column.

FIG. 6B depicts an example approach that can be performed by a stored procedure to determine an optimal multi-column encoding pattern in which different single-column encoding patterns can be applied to different columns. In blocks 608-616, each column is analyzed separately, and in blocks 608-612, each single-column encoding pattern is analyzed for a particular column. For the sake of clarity and ease of explanation, FIG. 6B depicts iterative processes for blocks 608-616 and block 608-612. However, in some embodiments, each column is analyzed in parallel, and for each column, each single-column encoding pattern is analyzed in parallel.

At block 608, the stored procedure invokes a query optimizer to determine a respective cost for each dictionary generation query of a single-column encoding pattern. For example, based on the characteristics of a first column, the query optimizer may estimate that the cost for a query generating a temporary dictionary will be "8" and that the cost of a query generating a persistent dictionary based on the temporary dictionary will be "5".

At block 610, the stored procedure determines a total cost for dictionary generation using the single-column encoding pattern. This may involve aggregating the costs for multiple queries. Continuing with the example above, the cost of the single-column encoding pattern would be "13".

At block 612, the stored procedure determines whether there are any other single-column encoding patterns to be analyzed. If so, block 612 proceeds to block 608. Otherwise, block 612 proceeds to block 614.

At block 614, the stored procedure selects the single-column encoding pattern having the lowest cost. This may involve comparing the costs of different single-column encoding patterns to determine which encoding pattern has a lower cost than any other single-column encoding pattern.

At block 616, the stored procedure determines whether there are any other columns to be encoded. If so, block 616 proceeds to block 608.

After block 616, the queries of the selected single-column encoding patterns are executed to generate multiple code dictionaries. Furthermore, encoded database data is generated based on executing a single query that joins multiple dictionaries with unencoded database data according to each of the selected single-column encoding patterns. The code dictionaries may be stored in any of a variety of ways, and each code dictionary may be replicated or partitioned.

Decoding a Column of Database Data

As mentioned above, a relational dictionary also enables leveraging the existing DBMS infrastructure to efficiently generate decoded database data. Generating decoded database data may involve rewriting a query to include a join operation between encoded database data and a relational dictionary. A query optimizer may select an implementation of the join operation that enables performance gains. Example implementations include a nested loop join, a hash join, or a sort merge join.

Decoded database data may be generated when evaluating a database query. In particular, some database queries include a predicate that is difficult to evaluate over codes.

For example, such a predicate may include a LIKE operation or a SUB STR( ) function. Thus, the predicate is evaluated over tokens instead.

However, for some columns, it is more efficient to evaluate a predicate over the tokens of a relational dictionary, not the tokens of decoded database data. Evaluating the predicate over the relational dictionary can reduce the size of the relational dictionary, thereby also reducing the cost of the join operation between the relational dictionary and encoded database data.

Thus, a query optimizer may be aware of multiple decoding patterns. Based on column characteristics, the query optimizer may determine the costs of database commands included in each decoding pattern, and the decoding pattern having the lowest total cost is selected for execution. Example decoding patterns are provided below.

FIGS. 7A-B depict example decoding patterns that each specify a sequence of database operations. Each decoding pattern can be used to evaluate a database query that comprises the predicate "WHERE token_column % LIKE 'ey'".

FIG. 7A depicts an example decoding pattern in which a predicate is evaluated after a join operation is performed. Unencoded table 100 is generated based on joining encoded table 106 with code dictionary 112. More specifically, column 108 of encoded table 106 is decoded into column 102 of unencoded table 100. Thereafter, filtered table 700 is generated based on evaluating the predicate over column 102 of unencoded table 100. Notably, column 702 excludes the token "Pat", and column 704 excludes the values of column 104 that share the same row with the token "Pat".

FIG. 7B depicts an example decoding pattern in which a predicate is evaluated before a join operation is performed. Filtered dictionary 706 is generated based on evaluating the predicate over tokens 114 of code dictionary 112. Notably, tokens 708 exclude the token "Pat", and codes 710 exclude the code "2", which is mapped to "Pat". Thereafter, filtered table 700 is generated based on joining filtered dictionary 706 with encoded table 106.

Any of the aforementioned implementations for encoding patterns can also be used for decoding patterns. For example, a stored procedure may determine an optimal decoding pattern using any of the approaches described above in association with FIGS. 2 and 6A-B.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
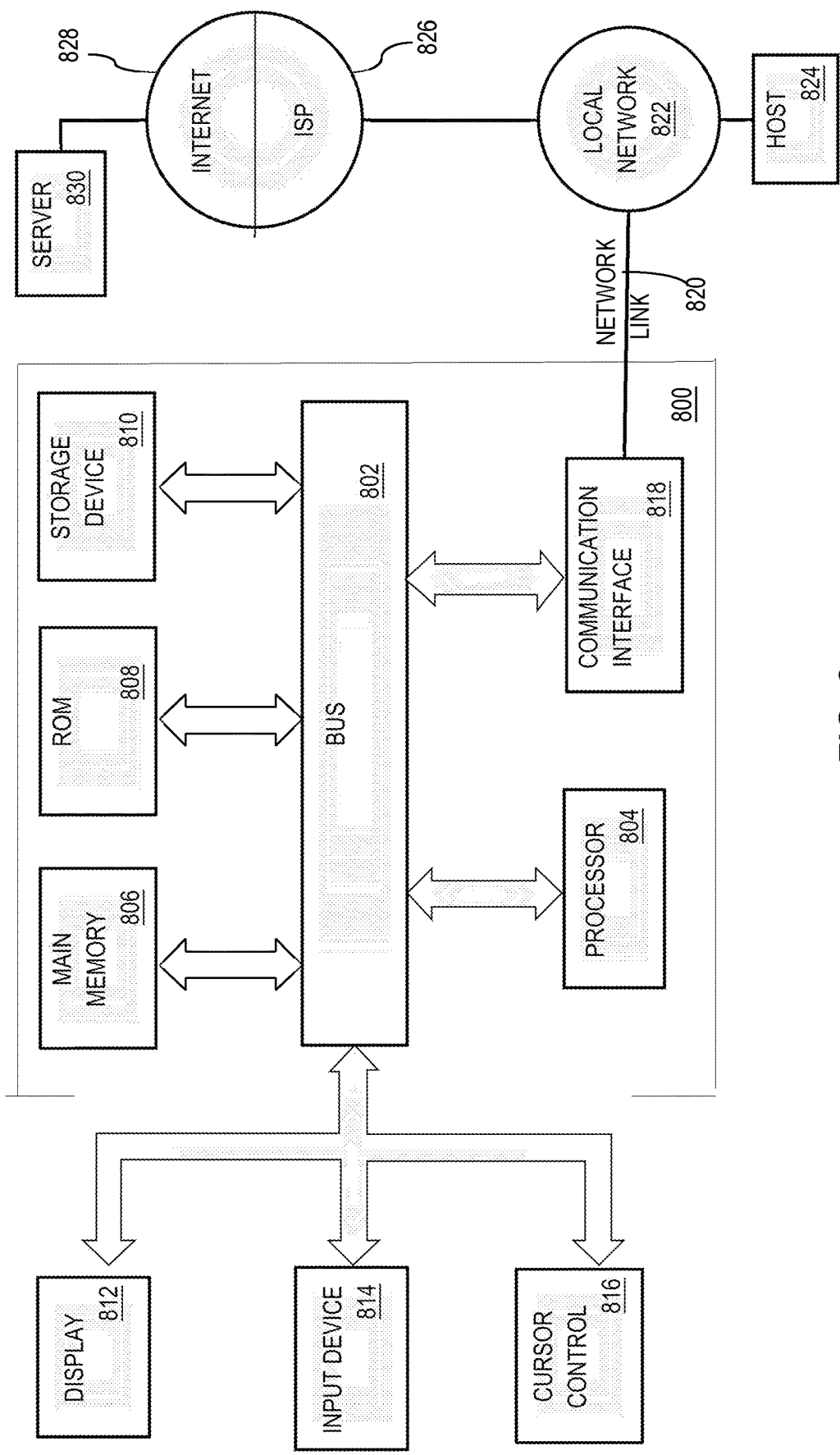
FIG. 8 depicts a computer system upon which embodiments may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

FIG. 9 is a block diagram of a software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 800. The applications or other software intended for use on system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of system 900. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
for each encoding pattern of a plurality of encoding patterns, each encoding pattern of said plurality of encoding patterns being implemented by at least a respective plurality of queries, the respective plurality of queries comprising one or more queries for generating a first code dictionary, invoking a query optimizer to determine a respective cost for the respective plurality of queries;
selecting a particular encoding pattern of said plurality of encoding patterns that has a lower respective cost than any other encoding pattern of said plurality of encoding patterns, said particular encoding pattern including particular one or more queries for generating a first set of tuples that maps a first set of codes to a first set of tokens stored in a first column of unencoded database data, said first code dictionary being a database table defined by a database dictionary and comprising columns that are each defined by said database dictionary;
executing said one or more particular queries to generate said first set of tuples;
generating encoded database data based on joining said unencoded database data with said first set of tuples;
generating decoded database data based on joining said encoded database data with said first set of tuples; and
wherein the method is performed by one or more computing devices.

2. The method of claim 1, wherein for each respective plurality of queries for each encoding pattern of said plurality of encoding patterns, said each respective plurality of queries comprises one or more queries for generating a second code dictionary comprising a second set of tuples that maps a second set of codes to a second set of tokens stored in a second column of said unencoded database data.

3. The method of claim 1, wherein executing said one or more particular queries includes:
determining said first set of tokens based on de-duplicating tokens stored in said first column of said unencoded database data;
determining said first set of codes based on performing a ranking function on said first set of tokens.

4. The method of claim 1, wherein executing said one or more particular queries includes:
a query that generates a temporary first code dictionary, said temporary first code dictionary being used to generate said encoded database data; and
a query that generates said first code dictionary based on de-duplicating tokens stored in said temporary first code dictionary.

5. The method of claim 4, wherein said temporary first code dictionary comprises row identifiers for said unencoded database data, and wherein said encoded database data is generated based on joining on said row identifiers.

6. The method of claim 4, wherein said unencoded database data is partitioned across a plurality of database nodes, wherein said temporary first code dictionary comprises database node identifiers for said unencoded database data, and wherein said encoded database data is generated based on joining on said database node identifiers.

7. The method of claim 1, further comprising prior to generating said encoded database data, storing a second code dictionary comprising a second set of tuples that maps a second set of codes to a second set of tokens stored in a second column of said unencoded database data, wherein said first code dictionary and said second code dictionary are generated based on different encoding patterns.

8. The method of claim 1, wherein generating said decoded database data comprises determining said first set of tuples based on evaluating a query predicate over said first code dictionary.

9. The method of claim 1, further comprising after generating said decoded database data, evaluating a query predicate over said decoded database data.

10. One or more non-transitory storage media storing a sequence of instructions which, when executed by one or more computing devices, cause:
  for each encoding pattern of a plurality of encoding patterns, each encoding pattern of said plurality of encoding patterns being implemented by at least a respective plurality of queries, the respective plurality of queries comprising one or more queries for generating a first code dictionary, invoking a query optimizer to determine a respective cost for the respective plurality of queries;
  selecting a particular encoding pattern of said plurality of encoding patterns that has a lower respective cost than any other encoding pattern of said plurality of encoding patterns, said particular encoding pattern including particular one or more queries for generating a first set of tuples that maps a first set of codes to a first set of tokens stored in a first column of unencoded database data, said first code dictionary being a database table defined by a database dictionary and comprising columns that are each defined by said database dictionary;
  executing said one or more particular queries to generate said first set of tuples;
  generating encoded database data based on joining said unencoded database data with said first set of tuples; and
  generating decoded database data based on joining said encoded database data with said first set of tuples.

11. The one or more non-transitory storage media of claim 10, wherein for each respective plurality of queries for each encoding pattern of said plurality of encoding patterns, said each respective plurality of queries comprises one or more queries for generating a second code dictionary comprising a second set of tuples that maps a second set of codes to a second set of tokens stored in a second column of said unencoded database data.

12. The one or more non-transitory storage media of claim 10, wherein executing said one or more particular queries includes:
  determining said first set of tokens based on de-duplicating tokens stored in said first column of said unencoded database data;
  determining said first set of codes based on performing a ranking function on said first set of tokens.

13. The one or more non-transitory storage media of claim 10, wherein executing said one or more particular queries includes:
  a query that generates a temporary first code dictionary, said temporary first code dictionary being used to generate said encoded database data; and
  a query that generates said first code dictionary based on de-duplicating tokens stored in said temporary first code dictionary.

14. The one or more non-transitory storage media of claim 13, wherein said temporary first code dictionary comprises row identifiers for said unencoded database data, and wherein said encoded database data is generated based on joining on said row identifiers.

15. The one or more non-transitory storage media of claim 13, wherein said unencoded database data is partitioned across a plurality of database nodes, wherein said temporary first code dictionary comprises database node identifiers for said unencoded database data, and wherein said encoded database data is generated based on joining on said database node identifiers.

16. The one or more non-transitory storage media of claim 10, wherein said sequence of instructions further comprise instructions which, when executed by said one or more computing devices, cause:
  prior to generating said encoded database data, storing a second code dictionary comprising a second set of tuples that maps a second set of codes to a second set of tokens stored in a second column of said unencoded database data,
  wherein said first code dictionary and second code dictionary are generated based on different encoding patterns.

17. The one or more non-transitory storage media of claim 10, wherein generating said decoded database data comprises determining said first set of tuples based on evaluating a query predicate over said first code dictionary.

18. The one or more non-transitory storage media of claim 10, wherein said sequence of instructions further comprise instructions which, when executed by said one or more computing devices, cause, after generating said decoded database data, evaluating a query predicate over said decoded database data.

* * * * *

UNITED STATES PATENT AND TRADEMARK OFFICE
CERTIFICATE OF CORRECTION

PATENT NO. : 11,169,995 B2
APPLICATION NO. : 15/819193
DATED : November 9, 2021
INVENTOR(S) : Fender et al.

Page 1 of 1

It is certified that error appears in the above-identified patent and that said Letters Patent is hereby corrected as shown below:

In the Specification

In Column 17, Line 2, delete "SUB STR()" and insert -- SUBSTR() --, therefor.

Signed and Sealed this
Fifth Day of April, 2022

Drew Hirshfeld
*Performing the Functions and Duties of the
Under Secretary of Commerce for Intellectual Property and
Director of the United States Patent and Trademark Office*